United States Patent [19]

Arndt

[11] Patent Number: 4,818,006
[45] Date of Patent: Apr. 4, 1989

[54] PICKUP BED PROTECTOR

[76] Inventor: Gustav E. Arndt, RR 1, Adrian, Mo. 64720

[21] Appl. No.: 131,452

[22] Filed: Dec. 11, 1987

[51] Int. Cl.⁴ .................... B61D 45/00; B62D 33/00
[52] U.S. Cl. ..................................... 296/32; 296/41; 410/110; 362/80
[58] Field of Search ............. 296/39 R, 41, 37.6, 296/32, 50; 410/106, 107, 109, 110, 117, 96; 362/80

[56] References Cited

U.S. PATENT DOCUMENTS

| | | | |
|---|---|---|---|
| 874,704 | 12/1907 | Reynolds | 296/41 |
| 1,704,138 | 3/1929 | Moesta | 296/199 |
| 2,218,814 | 10/1940 | Duffy | 296/199 |
| 3,731,831 | 5/1973 | Huff | 296/37.6 X |
| 3,904,223 | 9/1975 | Wilfert et al. | 296/187 |
| 4,160,052 | 7/1979 | Krysiak et al. | 296/41 |
| 4,181,349 | 1/1980 | Nix et al. | 296/39 R |
| 4,245,863 | 1/1981 | Carter | 296/39 R |
| 4,253,785 | 3/1981 | Bronstein | 410/110 |
| 4,604,013 | 8/1986 | Elwell et al. | 410/106 |
| 4,650,382 | 3/1987 | Johnson | 410/110 |

Primary Examiner—Robert B. Reeves
Assistant Examiner—John Gruber
Attorney, Agent, or Firm—Jerry T. Kearns

[57] ABSTRACT

A first embodiment of the pickup bed protector according to the present invention is constructed in the form of an elongated channel strip having a top wall portion with two integrally formed side walls. In use, the top wall portion is disposed over the side edge of a pickup bed, with the side walls extending along the inner and outer side walls of the pickup bed. A series of spaced apertures disposed along the inner side wall receive threaded fasteners to secure the protector to the pickup bed. In a second embodiment of the present invention, an elongated rectangular housing is formed on the top wall of the pickup bed protector and is provided with a secondary tail light and side light. A plurality of spring roll retracted straps are spaced along the rectangular housing, and in use, serve to secure loads within the pickup bed.

5 Claims, 5 Drawing Sheets

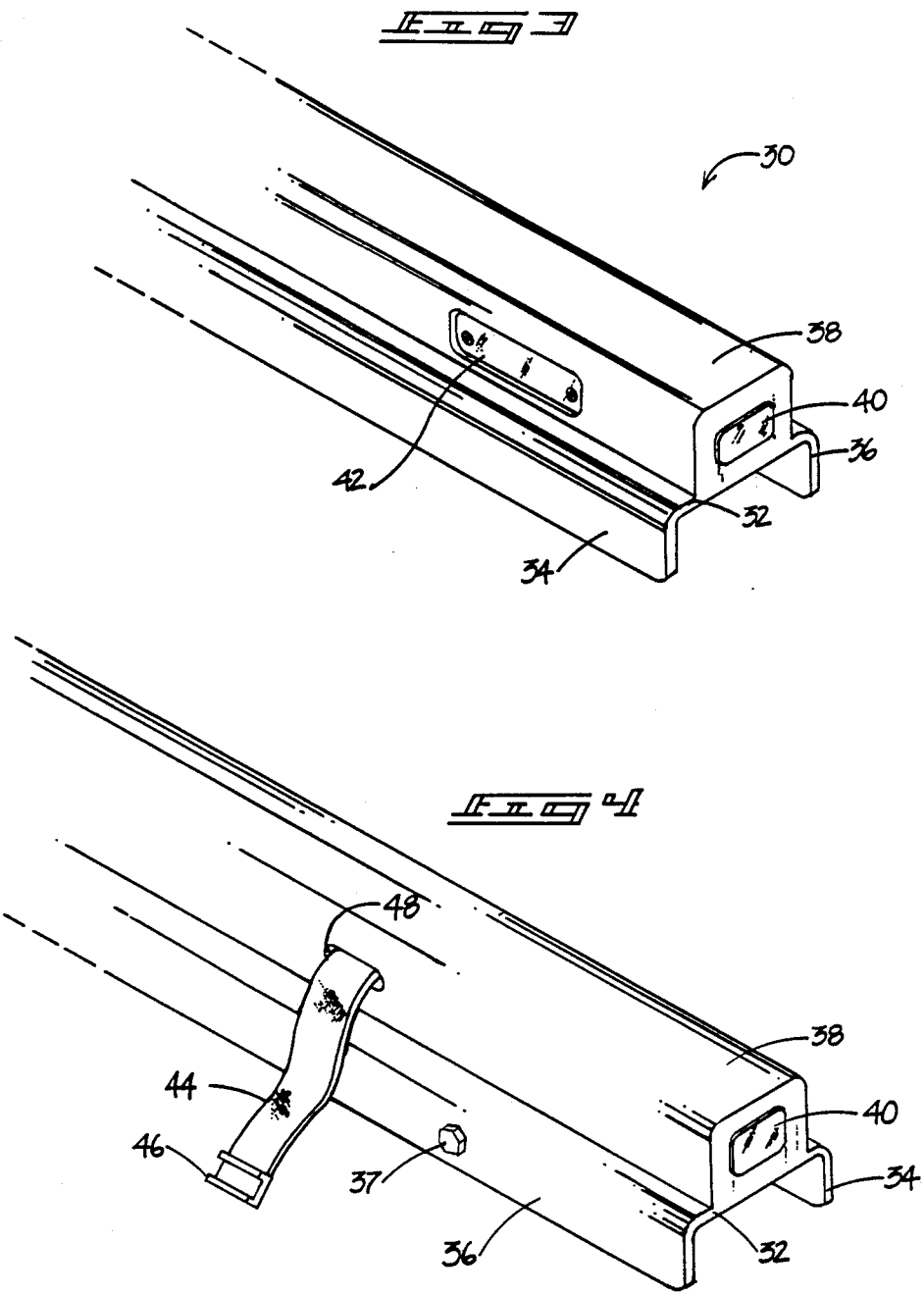

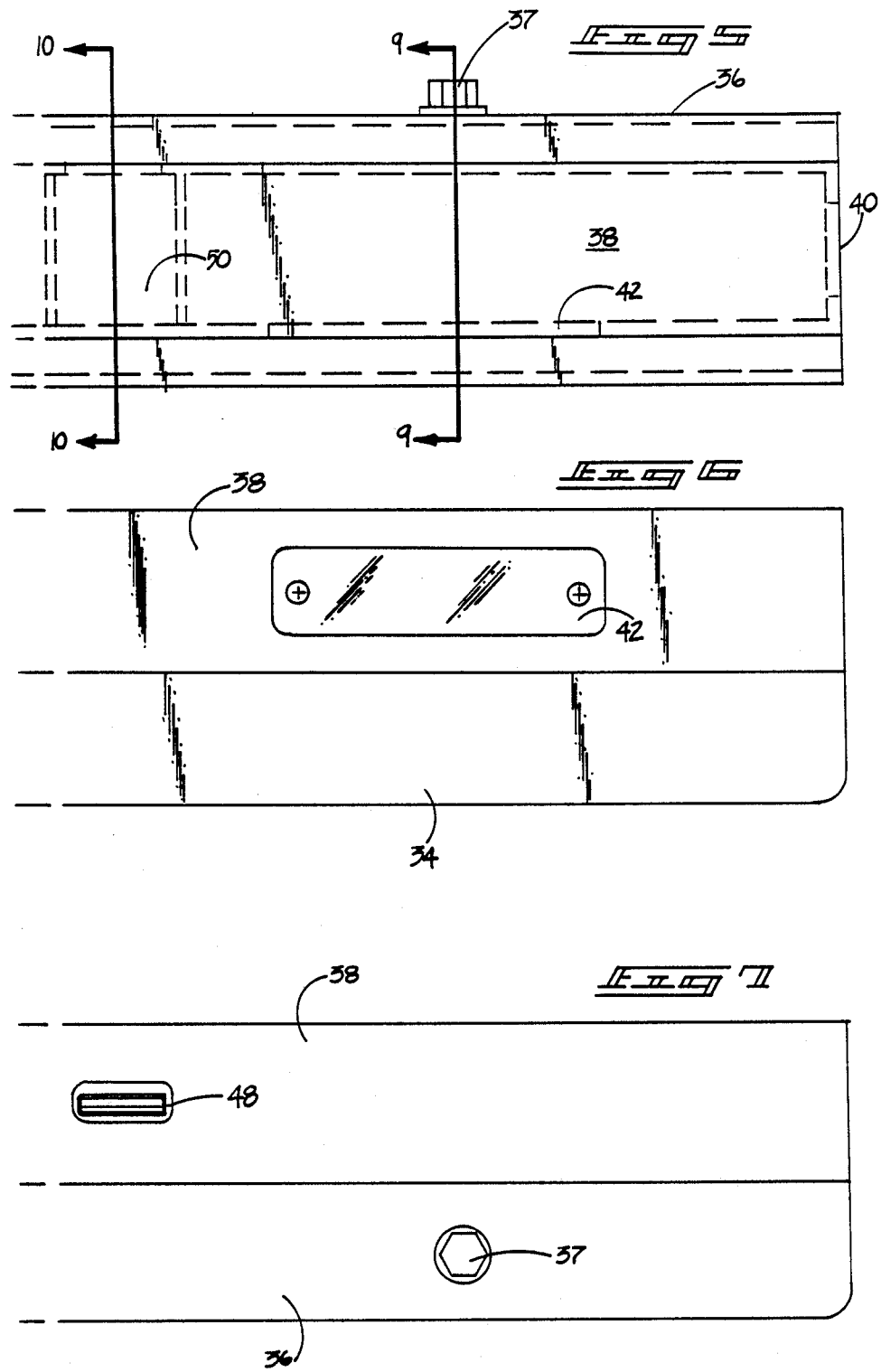

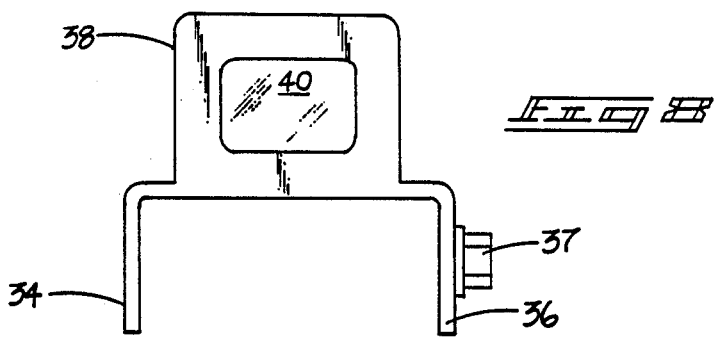
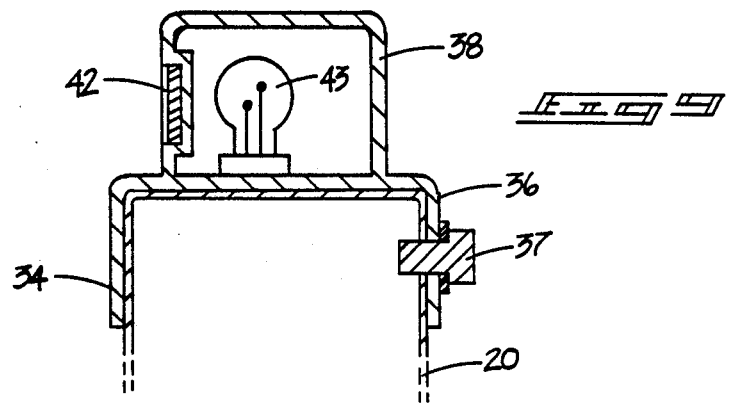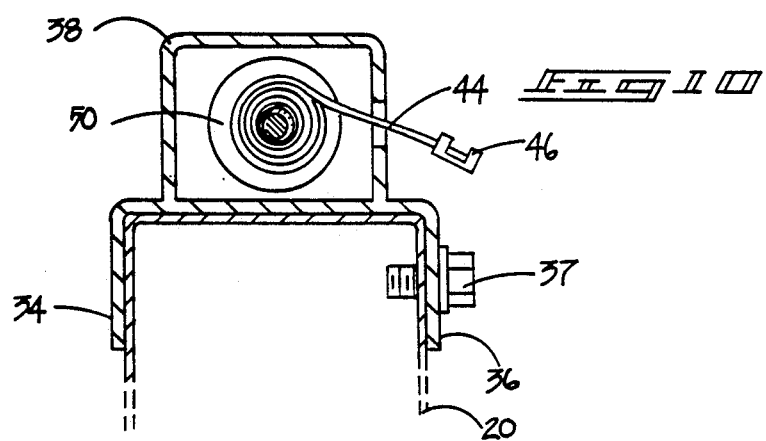

PICKUP BED PROTECTOR

BACKGROUND OF THE INVENTION

1. Field of the Invention

The present invention relates to pickup bed protectors, and more particularly pertains to a pickup bed protector which is formed as an elongated channel strip adapted to be placed over the top side edge of a pickup truck bed. Pickup trucks are utilized to haul a variety of loads. Frequently, during placement of these loads in the bed of the truck, the side edges of the pickup bed will be scratched by contact with the load. Over a period of time, the pickup bed will rust and deteriorate due to an accumulation of these scratches. In order to solve this problem, the present invention provides a pickup bed protector which is received over the top edge of a pickup bed.

2. Description of the Prior Art

Various types of pickup bed protectors are known in the prior art. A typical example of such a bed protector is to be found in U.S. Pat. No. 874,704, which issued to O. Reynolds on Dec. 24, 1907. This patent discloses a channel shaped strip which is nailed to a top edge of a wooden wagon box. U.S. Pat. No. 1,704,138, which issued to M. Moesta on Mar. 5, 1929, discloses a scuff plate for a vehicle body which is formed from a channel shaped metallic strip which is nailed to a wooden vehicle body. U.S. Pat. No. 2,218,814, which issued to J. Duffy on Oct. 22, 1940, discloses a door seal scuff plate for an automobile. The scuff plate is constructed of a metallic strip enclosed within a resilient sealing strip. U.S. Pat. No. 3,904,223, which issued to K. Wilfert et al on Sept. 9, 1975, discloses a protective insulation for the covering of windshield column, a roof frame and a rear windshield column in the interior space of an automobile. The device consists of a plastically deformable padded hollow member which has a curved surface provided with mounting flanges which are configured complimentary to the automobile body surfaces. U.S. Pat. No. 4,160,052, which issued to B. Krysiak et al on July 3, 1979, discloses a side edge automobile protecting strip for mounting along the length of an automobile. The device includes a metallic channel strip provided with a resilient bumper strip mounted therein. U.S. Pat. No. 4,604,013, which issued to D. Elwell et al on Aug. 5, 1986, discloses a side rail assembly for attachment to the upper wall of a pickup truck bed. The device includes a channel strip with an attached upstanding rail. Hidden threaded fasteners are utilized to secure the upstanding rail to a base plate and to the side rail of the pickup bed.

While the above mentioned devices are suited for their intended usage, none of these devices provide a pickup bed protector with secondary side and tail lights as well as a series of spaced spring retracted load securing straps. Inasmuch as the art is relatively crowded with respect to these various types of pickup bed protectors, it can be appreciated that there is a continuing need for and interest in improvements to such pickup bed protectors, and in this respect, the present invention addresses this need and interest.

SUMMARY OF THE INVENTION

In view of the foregoing disadvantages inherent in the known types of pickup bed protectors now present in the prior art, the present invention provides an improved pickup bed protector. As such, the general purpose of the present invention, which will be described subsequently in greater detail, is to provide a new and improved pickup bed protector which has all the advantages of the prior art pickup bed protectors and none of the disadvantages.

To attain this, representative embodiments of the concepts of the present invention are illustrated in the drawings and make use of an elongated channel strip having a top wall portion with two integrally formed side walls. In use, the top wall portion is disposed over the side edge of a pickup bed, with the side walls extending along the inner and outer side walls of the pickup bed. A series of spaced apertures disposed along the inner side wall receive threaded fasteners which secure the protector to the pickup bed. In a second embodiment of the present invention, an elongated rectangular housing is formed on the top wall of the pickup bed protector and is provided with a secondary tail light and side light. A plurality of spring roll retracted straps are spaced along the rectangular housing, and in use, serve to secure loads within the pickup bed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pickup bed protector which has all the advantages of the prior art pickup bed protectors and none of the disadvantages.

It is another object of the present invention to provide a new and improved pickup bed protector which may be easily and efficiently manufactured and marketed.

It is a further object of the present invention to provide a new and improved pickup bed protector which is of a durable and reliable construction.

An even further object of the present invention is to provide a new and improved pickup bed protector which is susceptible of a low cost of manufacture with regard to both materials and labor, and which accordingly is then susceptible of low prices of sale to the consuming public, thereby making such pickup bed protectors economically available to the buying public.

Still yet another object of the present invention is to provide a new and improved pickup bed protector which provides in the apparatuses and methods of the prior art some of the advantages thereof, while simultaneously overcoming some of the disadvantages normally associated therewith.

Still another object of the present invention is to provide a new and improved pickup bed protector which utilizes a channel strip adapted to be secured over the side rail of a pickup bed.

Yet another object of the present invention is to provide a new and improved pickup bed protector which utilizes a channel shaped strip having an enclosed housing for secondary tail and side lights.

Even still another object of the present invention is to provide a new and improved pickup bed protector with a series of spaced spring retracted load holding straps.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view, illustrating the outer side wall of a pickup bed protector according to a second embodiment of the present invention.

FIG. 4 is a perspective view, illustrating the inner side wall of a pickup bed protector according to a second embodiment of the present invention.

FIG. 5 is a top view of the pickup bed protector according to the second embodiment of the present invention.

FIG. 6 is a side view of the outer side of a pickup bed protector according to a second embodiment of the present invention.

FIG. 7 is a side view of the inner side of a pickup bed protector according to a second embodiment of the present invention.

FIG. 8 is an end view of the pickup bed protector according to a second embodiment of the present invention.

FIG. 9 is a transverse cross sectional view of the pickup bed protector of the second embodiment of the present invention, taken along line 9—9 of FIG. 5.

FIG. 10 is a transverse cross sectional view of the pickup bed protector of the second embodiment of the present invention, taken along line 10—10 of FIG. 5.

DESCRIPTION OF THE PREFERRED EMBODIMENT

Figure 1:
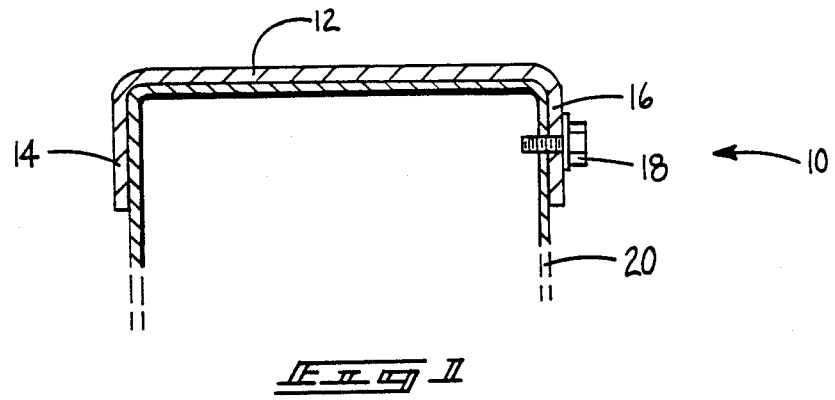
FIG. 1 is a transverse cross sectional view of a pickup bed protector according to a first embodiment of the present invention, mounted on a top side wall of a pickup truck bed.

With reference now to the drawings, and in particular to FIG. 1 thereof, a new and improved pickup bed protector embodying the principles and concepts of the present invention and generally designated by the reference numeral 10 will be described.

More specifically, it will be noted that the first embodiment 10 of the invention includes a channel shaped strip 12 having integrally formed opposed downwardly extending side walls 14 and 16. In use, the channel shaped strip 12 is placed over the side edge 20 of a pickup truck bed and secured by threaded fasteners 18 which extend through the inner side wall 16 and into the inner side wall of the pickup bed 20.

Figure 2:
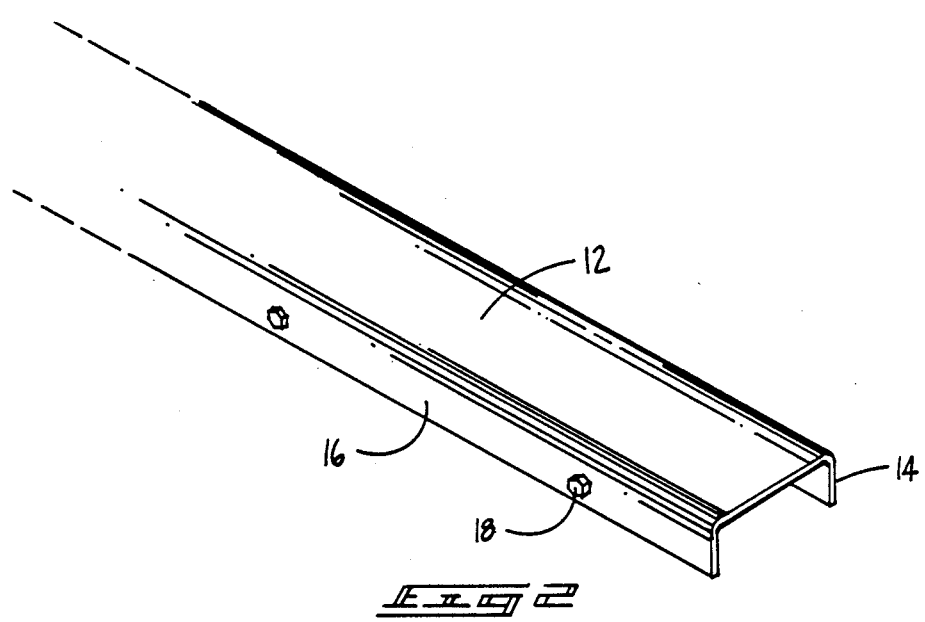
FIG. 2 is a perspective view of a pickup bed protector according to the first embodiment of the present invention.

In FIG. 2, a perspective view is provided of the pickup bed protector according to the first embodiment of the present invention. The channel shaped strip 12 may be formed from metal such as aluminum or galvanized steel or may be formed from a tough plastic material.

With reference now to FIG. 3, a second embodiment 30 of a pickup bed protector according to the present invention will now be described. A channel shaped strip 32 has a downwardly extending outer leg side wall 34 and an inner downwardly extending side wall 36. An enclosed housing 38, having a rectangular transverse cross section, is formed on a top wall of the channel shaped strip 32. A red plastic tail light lens 40 is disposed on an end surface of the housing 38 and a yellow plastic side light lens 42 is provided on an outer side of the housing 38. In use, two mirror image protector strips 32 are provided, one for the left side of the pickup bed and one for the right side of the pickup bed.

As shown in FIG. 4, a series of threaded fasteners 37 extend through the inner side wall 36 of the channel strip 32. In use, the threaded fasteners 37 will extend through holes drilled in the inner side wall of the pickup bed. A series of slots 48 are spaced along the inner side wall of the housing 38. A spring retracted load holding strap 44 extends through each of the spaced slots 48. A fastening buckle 46 is provided on the end of each of the straps 44.

As shown in FIG. 5, a conventional spring roll retraction assembly 50 is provided within the housing 38, adjacent each of the slots 48. The retraction roll assembly may be of the type utilized in automotive seatbelt systems. The relative positions of the red tail light lens 40 and yellow side light lens 42 may be understood with reference to FIG. 5.

In the side view of FIG. 6, it may be seen that the yellow side light lens is disposed on an outer side wall of the housing portion 38.

In FIG. 7, an inner side view illustrates the load strap slot 48, which extends through the inner side wall of the housing 38. A series of spaced threaded fasteners 37 are disposed through apertures provided along the inner side wall 36 of the pickup bed protector 30.

In FIG. 8, an end view is provided which illustrates the relative structural relationship between the inner side wall 36, the outer side wall 34 and the housing 38. The tail light lens 40 is mounted on the end face of the housing 38.

In the transverse cross sectional view of FIG. 9, a bulb 43 is illustrated within the housing 38. It should be understood that a single bulb 43 may be utilized for illumination of both the tail light lens 40 and the side light lens 42. In this case, a multiple element type bulb will be utilized. Alternatively, an paque partition wall may be provided to create separate compartments and separate bulbs may be utilized for illumination of the tail light lens 40 and side light lens 42. The bulb 43 affords an added measure of safety by providing a raised brake light and side light, disposed above the conventional truck tail lights. During assembly, the electrical connections for the bulb 43 are made by tapping the vehicle wiring for the existing tail lights.

In the transverse cross sectional view of FIG. 10, the spring retract roll 50 is illustrated. The load holding strap 44 is coiled around the spring retract roll 50, and is provided with a buckle fastener 46 for engagement with a load holding strap 44 provided at the opposite side of the pickup truck bed. Thus, it may now be understood that by providing a pair of mirror image left and right hand pickup truck bed protectors 30, on opposite sides of the pickup truck bed, that the straps 44 may be utilized to secure a variety of loads within the bed of the truck.

Figure 11:
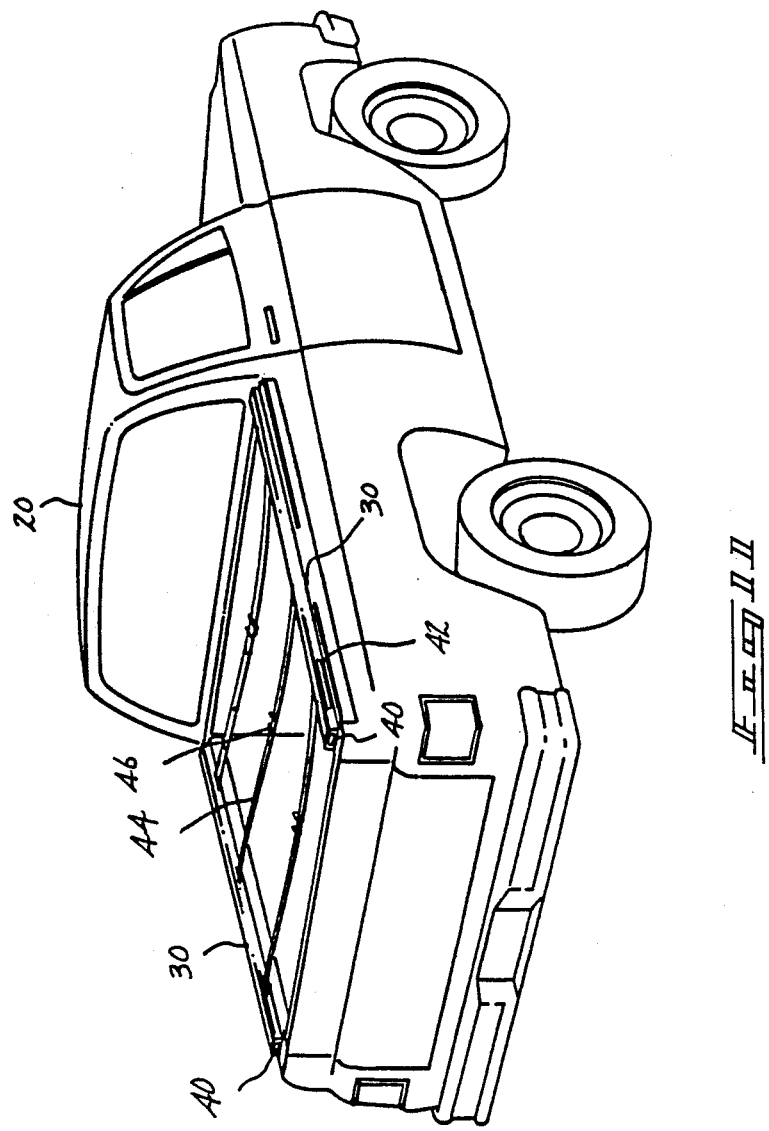
FIG. 11 is a perspective view of the pickup bed protector of the present invention mounted on a pickup truck.

In FIG. 11, a perspective view is provided illustrating a pair of pickup bed protectors 30, mounted on a conventional pickup truck 20. As is now readily apparent, the pickup truck bed protectors 30 of the present invention perform the combined functions of preventing damage to the top side edges of the pickup truck bed, securing loads within the pickup truck bed and affording an added measure of safety by virtue of secondary tail lights, 40 and side lights 42. The pickup bed protectors 30 according to the second embodiment of the present invention may be formed from aluminum, galvanized steel or a tough plastic material.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved pickup bed protector, comprising:
   an elongated channel shaped strip having a horizontal top wall with inner and outer vertically downwardly extending side walls;
   a series of spaced apertures for reception of threaded fasteners provided along the length of said inner side wall;
   an elongated housing having a generally rectangular transverse cross section provided on an outer surface of said top wall;
   a series of spaced slots extending through an inner side wall of said housing; and
   a spring retraction roller in said housing, adjacent each of said slots.

2. The pickup bed protector of claim 1, further comprising a strap around each of said rollers, each of said straps having an end extending through said adjacent slot and provided with a fastening buckle.

3. The pickup bed protector of claim 1, further comprising a red tail light lens disposed on an end face of said housing;
   a yellow side light lens disposed on an outer side wall of said housing, adjacent said end face; and
   bulb means in said housing for illuminating said tail and side light lenses.

4. A new and improved pickup bed protector, comprising:
   an elongated channel shaped strip having a horizontal top wall with inner and outer vertically downwardly extending side walls;
   a series of spaced apertures for reception of threaded fasteners provided along the length of said inner side wall;
   an elongated housing having a generally rectangular transverse cross section provided on an outer end surface of said top wall;
   a series of spaced slots extending through an inner side wall of said housing;
   a spring retraction roller in said housing, adjacent each of said slots;
   a strap around each of said rollers, said strap having an end extending through said adjacent slot and provided with a fastening buckle;
   a red tail light lens disposed on an end face of said housing;
   a yellow side light lens disposed on an outer side wall of said housing, adjacent said end face; and
   bulb means in said housing for illuminating said tail and side light lenses.

5. A new and improved pickup bed protection system, comprising:
   a pair of mirror image left and right hand elongated channel strips, each of said strips comprising:
   an elongated channel shaped strip having a horizontal top wall with inner and outer vertically downwardly extending side walls;
   a series of spaced apertures for reception of threaded fasteners provided along the length of said inner side wall;
   an elongated housing having a generally rectangular transverse cross section provided on an outer end surface of said top wall;
   a series of spaced slots extending through an inner side wall of said housing;
   a spring retraction roller in said housing, adjacent each of said slots;
   a strap around each of said rollers, said strap having an end extending through said adjacent slot and provided with a fastening buckle;
   a red tail light lens disposed on an end face of said housing;
   a yellow side light lens disposed on an outer side wall of said housing, adjacent said end face; and
   bulb means in said housing for illuminating said tail and side light lenses.

* * * * *